US005525998A

United States Patent [19]

Geier

[11] Patent Number: 5,525,998

[45] Date of Patent: Jun. 11, 1996

[54] ODOMETER ASSISTED GPS NAVIGATION METHOD

[75] Inventor: George J. Geier, Tempe, Ariz.

[73] Assignee: Motorola, Inc., Schaumburg, Ill.

[21] Appl. No.: 283,697

[22] Filed: Aug. 1, 1994

[51] Int. Cl.[6] .............................. G01S 5/02; G01S 3/02; G01C 21/00

[52] U.S. Cl. .......................... 342/357; 342/457; 364/449

[58] Field of Search .................................. 345/357, 457; 364/450, 449

[56] References Cited

U.S. PATENT DOCUMENTS

| | | | |
|---|---|---|---|
| 4,231,613 | 3/1988 | Endo et al. | 342/357 |
| 5,119,101 | 6/1992 | Barnard | 342/357 |
| 5,416,712 | 5/1995 | Geier et al. | 364/450 |

*Primary Examiner*—Gregory C. Issing
*Attorney, Agent, or Firm*—Frank J. Bogacz

[57] ABSTRACT

An odometer assisted global positioning system (GPS) method operates in a vehicle to indicate the position of the vehicle. The vehicle has an odometer, a processor, and a GPS receiver. The method knows the last position of the vehicle and finds a measured Doppler and a measured pseudo range for each satellite of the GPS which is in line of sight with the vehicle. The processor determines the Doppler compensation to the measured Doppler. The processor combines the speed of the vehicle with the Doppler compensation to the measured Doppler in order to produce a new heading of the vehicle. The processor combines the last known position of the vehicle with the new heading and with the Doppler compensation and the measured pseudo range to provide a new position of the vehicle.

15 Claims, 6 Drawing Sheets

ODOMETER ASSISTED GPS NAVIGATION METHOD

BACKGROUND OF THE INVENTION

The present invention pertains to global positioning system (GPS) navigation and more particularly to odometer assisted GPS navigation.

The GPS system may be used for the location of vehicles. In such a system, the vehicle equipped with a GPS receiver and a processor receives signals from at least three of a constellation of GPS satellites and triangulates to self-determine its own position. Line of sight transmission from a satellite to a vehicle is extremely important since the vehicle must be able to receive the satellites' signals. If the vehicle is unable to accurately receive the satellite signals, proper position of the vehicle may not be able to be determined. A problem exists in a city's urban canyons, streets with high rise buildings surrounding it. The urban canyon provides for blocking the GPS satellite signals from being received by a vehicle. As a result, the vehicle's GPS receiver may be unable to receive at least three satellite signals to adequately self-determine its position. The vehicle's odometer can provide distance travelled information, but the heading of the vehicle needs to be determined to find the vehicle's position.

One solution to this problem is to use gyroscope technology to assist the GPS when GPS is not operational in urban canyons. Low cost gyroscope technology is not well developed at present.

A second solution may include the application of magnetic compasses when in an urban canyon. Magnetic compasses are unreliable in environments such as urban canyons in which there are many buildings made of steel which will affect the magnetic compass adversely.

Lastly, a differential odometry solution may be employed to solve the problem of GPS satellite signal loss in an urban canyon. This solution may be effective if it is already built in to the vehicle. If it is to be installed, the solution then becomes very expensive because sensors must be placed at the wheels of the vehicle in an accurate position. This is an expensive proposition to retrofit to vehicles. Also, the sensors are extremely sensitive to skidding of the vehicle with brakes locked.

Accordingly, what is needed is a low cost system to augment a basic GPS receiver for vehicle location in urban canyons.

DESCRIPTION OF THE PREFERRED EMBODIMENT

Figure 1:
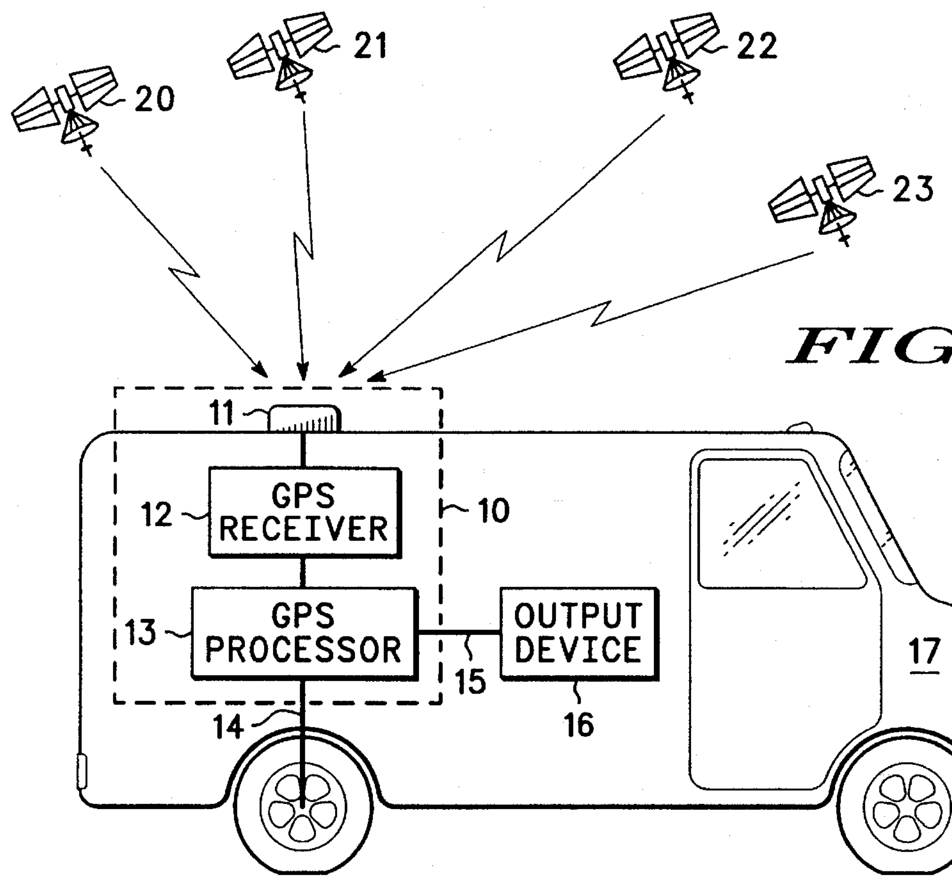
FIG. 1 is a diagram of tracking of a vehicle by a number of satellites of the Global Positioning System (GPS)in accordance with the present invention.

FIG. 1 illustrates the use of odometer-assisted GPS (Global Positioning System) navigation in the navigation and/or tracking of a land vehicle 17. When used for navigating the vehicle, the GPS processor 13 will interface to an output device 16 via interface 15 which will generally be a map or LCD (Liquid Crystal Display). For vehicle tracking, on the other hand, the output device 16 will generally be a storage device (e.g., RAM (random access memory)) or a modem/radio combination used for transmission of position information to a remotely located base station (not shown).

A GPS receiver 10 acquires and tracks signals from a number of GPS satellites 20, 21, 22, and 23 (up to the number of receiver channels, for a parallel tracking receiver), and uses the pseudo range and Doppler information derived from these signals to estimate the position and velocity of the vehicle 17. Following the signal reception by the GPS antenna 11, filtering, down conversion and correlation is performed by the GPS receiver 12, and signal in-phase and quadrature components are input to the GPS processor 13, typically a microprocessor. Odometer assisted GPS receiver unit 10 occurs through an odometer interface 14 to the GPS processor 13. The odometer assistance is used to improve the accuracy of GPS when a sufficient number of satellites is in view to derive a position solution (generally 3 are required), and to extend the positioning availability when an insufficient number of GPS satellites can be tracked.

Figure 2:
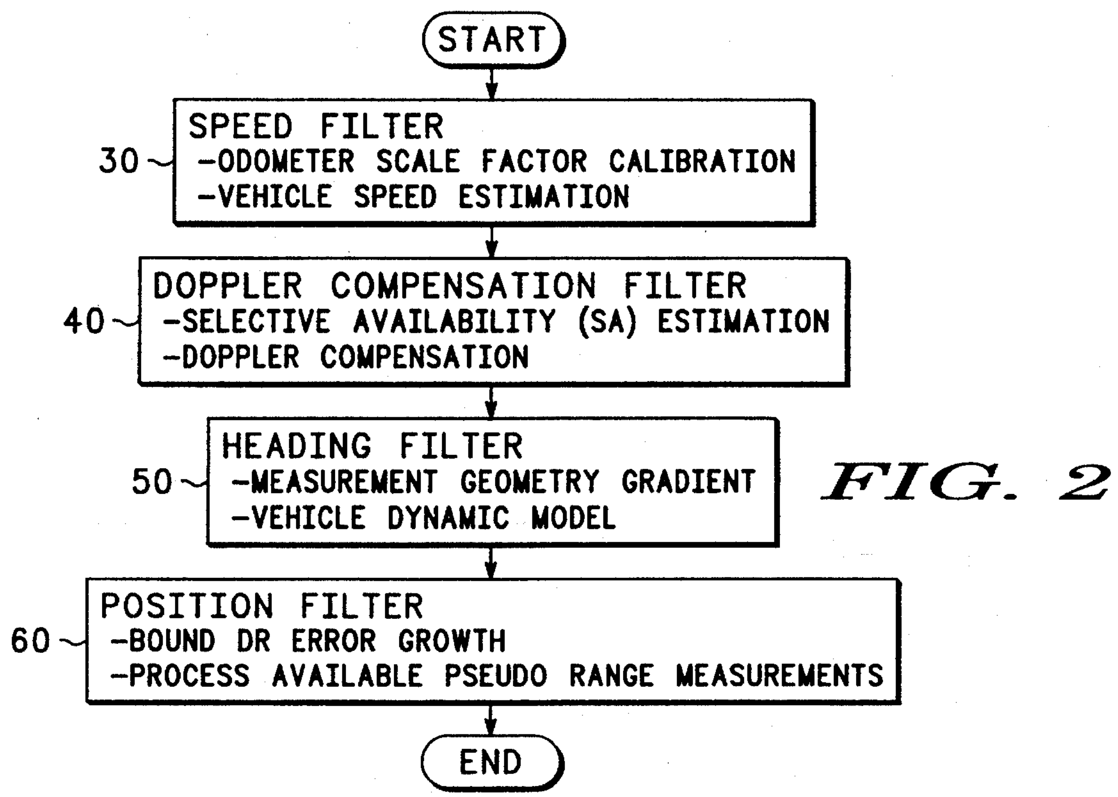
FIG. 2 is a flow chart of an odometer assisted GPS navigation method in accordance with the present invention.

FIG. 2 provides a flow-chart of the odometer-assisted GPS navigator method as it could be implemented in the GPS Processor 13. Its major functions include a Speed Filter 30, a Doppler Compensation Filter 40, a Heading Filter 50, and a Position Filter 60. Each of these major functions is flow-charted in subsequent FIGS.

Figure 3:
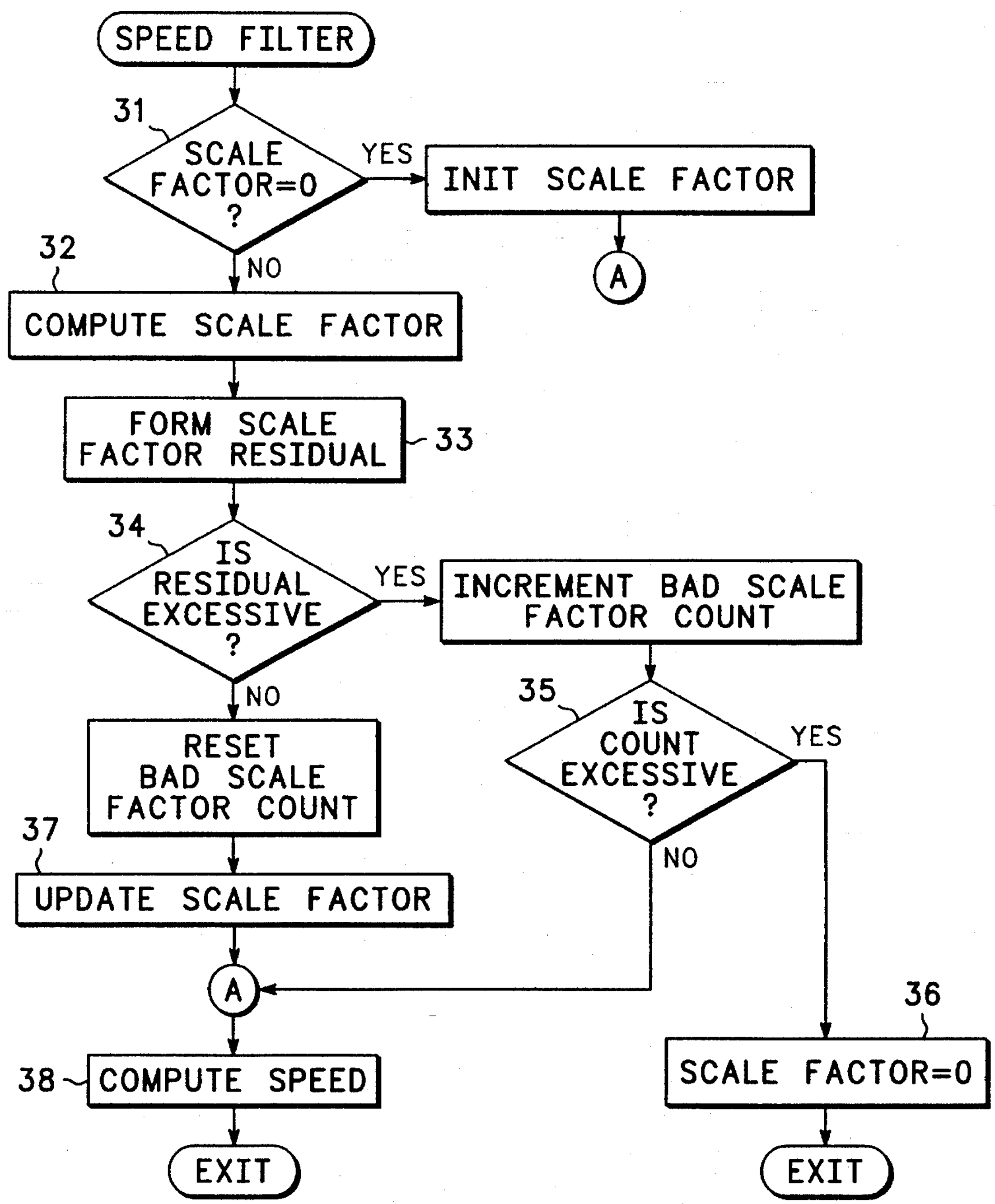
FIG. 3 is a flow chart of a speed filter of an odometer assisted GPS navigation method in accordance with the present invention.

The Speed Filter 30 (see FIG. 3) computes the scale factor associated with the odometer, and so estimates vehicle speed by appropriately scaling odometer pulse counts. Calculation of the odometer scale factor is completely automatic: no special operator interaction at installation will be necessary. Initially, and until a proper value is determined, the scale factor defaults to a zero value, as illustrated 31. Initial driving at significant speed (e.g., above 25 mph) is required to initialize the scale factor to a non-zero value; following this, the scale factor is adjusted each second by low-pass filtering 37 the difference between the GPS computed scale factor 32 and the current computed scale factor 33. The time constant of the low pass filter will be sufficiently long to attenuate the effects of Selective Availability (SA), i.e., several minutes. When the Odometer-Assisted GPS Navigator unit is turned off, the computed scale factor will be saved in battery backed-up RAM, and accessed when power is again supplied to the unit.

Detection of and recovery from possible anomalous events is required for robust operation of the Speed Filter 30: such events include tire skidding and slipping, GPS tracking of reflected signals, and improper scale factor initialization. Anomalous events will be detected by observing the difference (residual as computed in 33) between the scale factor measured from the current pulse count increment and the current scale factor in the GPS processor's data base 34. An excessive residual is indicative of either an erroneous GPS velocity (as could be caused by reflected signal tracking) or an erroneous pulse count increment (as could be caused by tire skidding or slipping): in either case, the current scale factor measurement will be neglected, a bad scale factor measurement counter will be incremented, and a flag will be set for use by the Heading Filter 50 (as an indication of possible erroneous Doppler measurements). If the bad scale factor measurement counter exceeds a maximum allowable level 35, indicating that the current scale factor may be erroneous (e.g., it could have been initially determined while the vehicle was skidding), the scale factor will be set to zero 36, forcing its re-initialization the next time the speed filter 30 is active. If the scale factor residual 33 is not excessive, the scale factor measurement counter is reset to zero and the scale factor is updated 37. Once an appropriate value has been determined for the scale factor, the speed is derived from the current pulse count increment 38.

Figure 4:
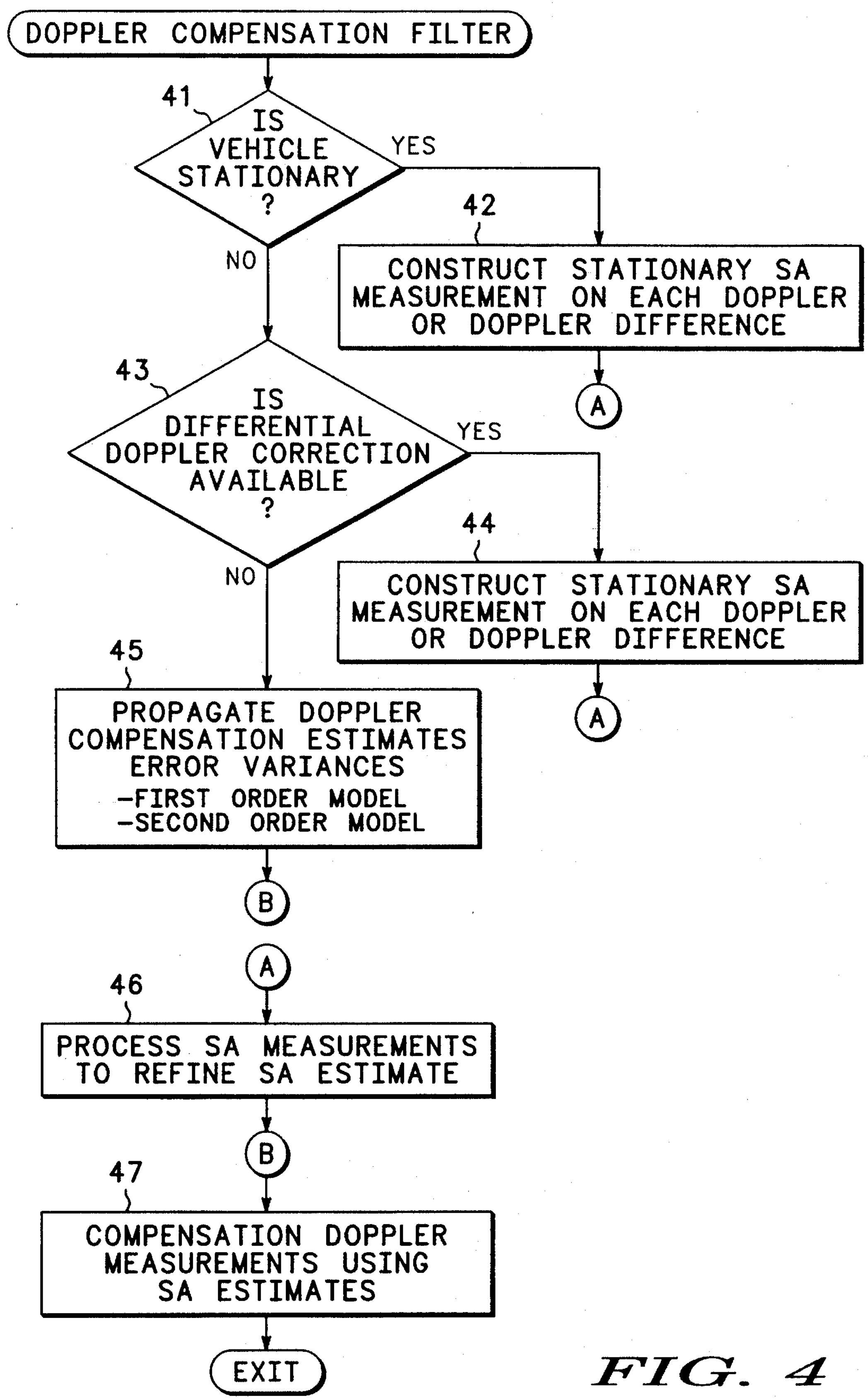
FIG. 4 is a flow chart of a Doppler compensation filter of an odometer assisted GPS navigation method in accordance with the present invention.

In FIG. 4, the use of the Doppler compensation filter is outlined. The operation of this filter can significantly improve the operation and performance of the odometer-assisted GPS navigator. The filter requires that the derived pulse count can accurately reflect when the vehicle is stationary, i.e., that Hall-effect, rather than variable reluctance sensing, is utilized. If the vehicle is determined to be stationary 41, this information is used to estimate the component of SA on each Doppler (or Doppler difference) 42. Equation (1) illustrates how the stationary information is utilized:

$$\mathrm{PRRres}_i=\mathrm{delPRR\_SA}_i+\mathrm{uLOS}_i^T\ \mathrm{del\_vsat}_i+\mathrm{delF}+\mathrm{delPRRn}_i \qquad (1)$$

where:

$\mathrm{PRRres}_i=\mathrm{PRR}_i-\mathrm{uLOS}_i^T\mathrm{vsat}_i$

PRRi= measured Doppler to ith GPS satellite $\mathrm{uLOS}_i$=Line Of Sight vector to ith satellite T denotes vector transpose operation $\mathrm{vsat}_i$=ephemeris determined velocity of ith satellite $\mathrm{delPRR\_SA}_i$=Doppler measurement error on ith satellite due to SA dither $\mathrm{del\_vsat}_i$=error in determining velocity of ith satellite delF=error in local oscillator frequency $\mathrm{delPRRn}_i$=Doppler measurement noise Since the vehicle is known to be stationary, there is no Doppler component due to vehicle motion, and Equation (1) can be used to estimate and remove the contribution due to SA, which is the dominant term. SA consists of 2 components, referred to as "dither" and "epsilon" with each contributing roughly 0.25 m/sec of error one sigma: the two effects are independent, with the epsilon component arising from intentional perturbations to the broadcast orbital elements (and so appearing as a satellite velocity error del_vsat), and the dither component arising from random perturbations to each satellite clock. Both effects produce relatively slowly varying Doppler measurement error, with the "dither" component having a period of a few minutes, and the "epsilon" component a period of several hours. The "epsilon" term is, of course, "modulated" by changes in the line of sight vector uLOS to each satellite, but this is also very slowly varying. The Doppler measurement error, delPRRn, is generally very small (i.e., a few centimeters per second), and so can be neglected. The last term, delF, can be removed by differencing pairs of Doppler measurements, as illustrated in Equation (2):

$$\mathrm{delPRRres}_{ij}=\mathrm{delPRR\_SAij}+\mathrm{uLOS}_i^T\mathrm{del\_vsat}_i-\mathrm{uLOS}_j^T\mathrm{del\_sat}_j+\mathrm{delPRRn}_i \qquad (2)$$

The dominant terms in Equation (2) are still the SA dither difference delPRR_SAij (where i and j are the two satellite indices), and the differences in the satellite velocity error components ($\mathrm{del\_vsat}_i$ and del_vsatj) projected along the respective lines of sight ($\mathrm{uLOS}_i$ and $\mathrm{uLOS}_j$): the contribution due to noise differences is still negligible, and the frequency error component (delF) drops out when differencing $\mathrm{delPRRres}_i$ and $\mathrm{delPRRres}_j$. In addition, differencing the Doppler measurements in this way does not alter their frequency content, so the Doppler difference error estimate derived from $\mathrm{delPRRres}_{ij}$ can be used to compensate the differenced Doppler measurements for periods of time when the vehicle is no longer stationary. This is the essence of the compensation scheme. In between stationary periods, the compensation term ($\mathrm{delPRRres}_{ij}$) is propagated using a simple exponential decay model 45 with a time constant which is characteristic of the highest frequency of the Doppler error terms induced by SA, roughly 90–100 seconds. Thus, for long periods between stops, the compensation becomes unreliable, and is automatically "turned off" by the model, and uncompensated performance results. Equation (3) illustrates the time propagation model:

$$\mathrm{delPRRres}_{ij}=\mathrm{prop\_factor(dt)}\ \mathrm{delPRRres}_{ij} \qquad (3)$$

where:

prop_factor(dt)=exp(-dt/tau)

dt=time interval between Doppler measurements (1 second nominally)

tau=characteristic time, nominally 90–100 seconds

Finally, given the current estimate for delPRRresij, whether propagated by Equation (3) process 45 or just derived as in Equation (2) process 42, each Doppler difference is compensated 47, for use in either the GPS velocity solution (when sufficient satellites are in view), or the Heading Filter 50. In addition to the time propagation of the error term 45, as evidenced by Equation (3), an error variance is also propagated 45, for use by the Heading Filter 50: this error variance reflects the accuracy of the compensation as affected by the time period between stops. Equation (4) illustrates the time propagation of the error variance:

$$\mathrm{varPRR}_{ij}=\mathrm{varPRR}_{ij}+2\ (1\text{-}\mathrm{prop\_factor(dt)})\ (\mathrm{varPRRss}_{ij}-\mathrm{varPRR}_{ij}) \qquad (4)$$

where:

$\mathrm{varPRRss}_{ij}$=uncompensated PRR error variance $\mathrm{varPRR}_{ij}$=compensated Doppler error variance Each time that a stationary measurement is taken, as represented by Equation (2), the compensated Doppler error variance $\mathrm{varPRR}_{ij}$ is set to the noise floor error variance (i.e., the error variance of the $\mathrm{delPRRn}_{ij}$ term). Following this, the error variance will grow according to Equation (4), until it reaches $\mathrm{varPRRss}_{ij}$, which is set to the nominal (uncompensated) Doppler measurement error variance. A possible improvement to this propagation model can be derived if stationary measurements are available with a frequency which is high relative to the SA period. This improvement extends the compensation algorithm to include estimation of the rate of change of SA, based upon the last few stationary Doppler measurements; this rate of change estimate can then be used to improve future (propagated) estimates until the next stationary measurement is taken. The covariance propagation (Equation (4)) would then be modified to reflect the presence of the estimate of the rate of change of SA: thus a two state Doppler compensation filter would replace the single state filter described by Equations. (3) and (4) and used in processes 42, 45 and 46.

In addition to the operation of the Doppler compensation filter, differential correction data, which could be broadcast from a nearby differential reference station and received by the vehicle using an appropriately designed radio, can be used to remove the effects of SA on each Doppler measurement 43. Because of the independence of the Doppler compensation and the differential corrections, there can be a synergy in their combination, i.e., it is not necessary to simply use one or the other. Of course, the pseudo range rate correction data received from the reference station must be pair-wise differenced in the same way as the stationary Doppler measurements to be combined effectively 44. Given the availability of both differential corrections and stationary Doppler measurements, an estimate of the rate of change of SA can be more reliably obtained by examining the previous time history of the measurements, and used in the improved propagation model described in the previous paragraph.

Figure 5:
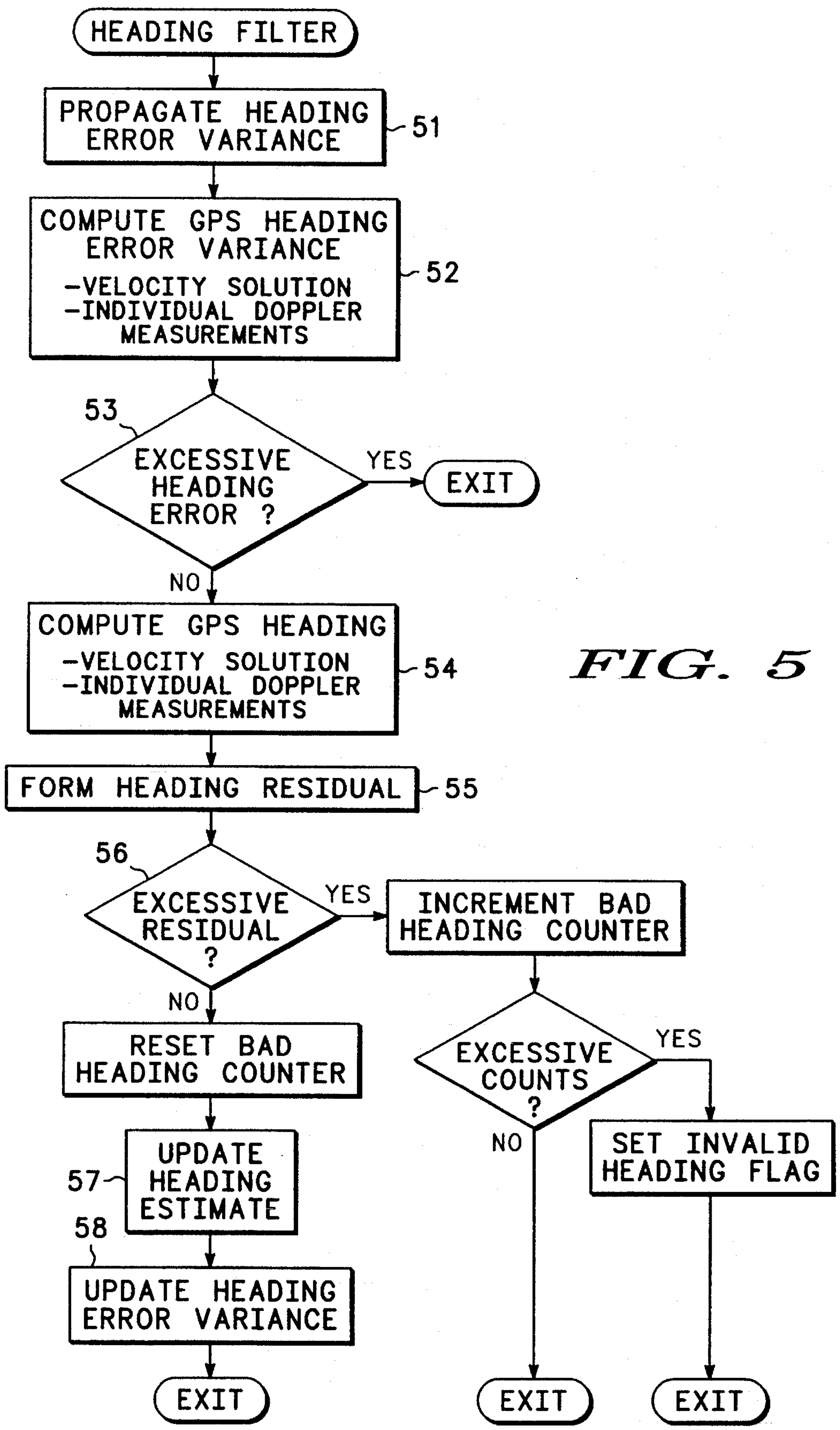
FIG. 5 is a flow chart of a heading filter of an odometer assisted GPS navigation method in accordance with the present invention.
Figure 6:
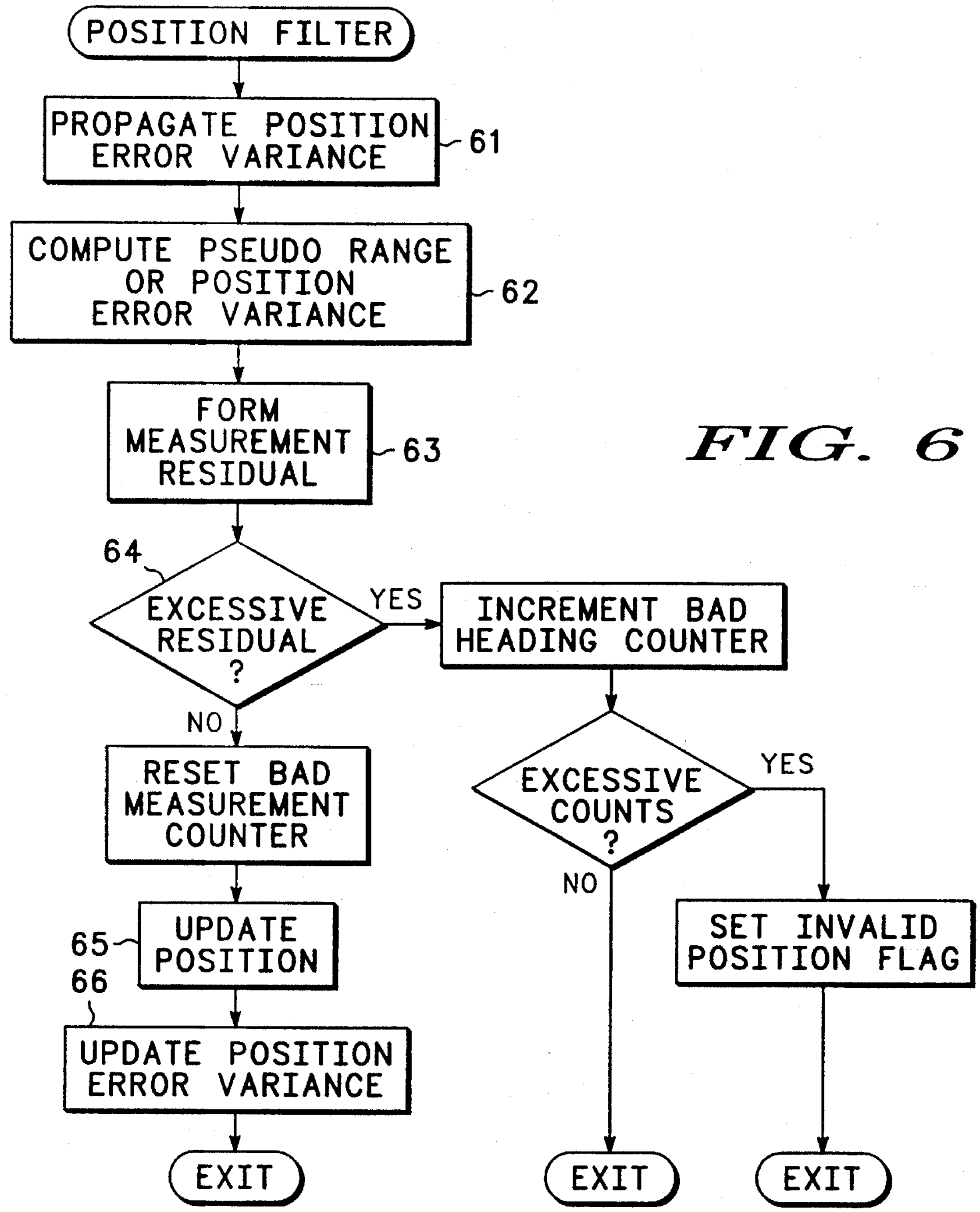
FIG. 6 is a flow chart of a position filter of an odometer assisted GPS navigation method in accordance with the present invention.

The Heading Filter algorithm forms the heart of the odometer-assisted GPS navigator, and is outlined in FIG. 5. Stated in simplest terms, the Heading Filter will be based upon a Schmidt-Kalman filter, utilizing a model for heading dynamics which is typical for a land vehicle, and a GPS heading measurement derived from the (compensated) Doppler measurements and the odometer determined speed. Because of the odometer-assistance, GPS heading information can be derived when computation of a velocity from GPS is no longer possible. Following initialization to the first GPS based heading of desired accuracy, the heading error variance is propagated 51 based on the expected vehicle dynamics. The vehicle dynamics are represented by the maximum lateral acceleration which can be achieved under non-skidding conditions and the minimum speed required for the vehicle to turn. If the minimum speed is not reached, the heading error variance will remain constant; otherwise, the specified maximum lateral acceleration is divided by the current speed to predict the maximum heading change which can occur over the current interval. Equation (5) provides the necessary mathematical description:

$$\text{varH}=\text{varH}+q(v)\ dt \quad (5)$$

where:

q(v) is proportional to the $Hdot_{max}$ (the maximum heading rate)

dt=time interval (nominally 1 second)

| | |
|---|---|
| $Hdot_{max} = a_{max}/v$ | $v > v_2$ |
| $Hdot_{max} = Hdot$ | $v_1 < v < v_2$ |
| $Hdot_{max} = (v - v_{min}) * Hdot/v_1$ | $v_{min} < v < v_1$ |
| $Hdot_{max} = 0$ | $v < v_{min}$ |

Reasonable values for the model parameters are given below:

$a_{max}$=0.2 g=2 m/sec$^2$ $v_{min}$=1 m/sec

Hdot=30 degrees/sec.=0.52 radians/sec.

$V_2$=3.85 meters/sec.

The following philosophy guides the selection of these values: although these constraints do not cover all possible conditions, they should apply to the conditions which are normal for an urban vehicle. Abnormal conditions, however, should not cause a "breakdown" of the algorithm, but be handled as exceptions, i.e., rare circumstances which will trigger a re-initialization of the heading filter.

The proportional factor used to scale $Hdot_{max}$ adapts to the computed residual (i.e., $H_{res}$); i.e., to use a small value when it appears that the vehicle is travelling straight, and a large value when it is believed to be turning. An adaptive approach is outlined below.

The following set of equations represent the desired level of adaptivity in the computation of q(v):

q(v)=q_scale * ($Hdot_{max}$* dt)$^2$ alpha=(Hres$^2$ / varHres)

if (alpha<1) q_scale=(1-down_scale) * q_scale if ((alpha>4) && (alpha<9)) q_scale=q_scale+up_scale * (q_scale_max - q_scale:

The adaptivity parameter q_scale is initialized to q_scale_max, tentatively set to 3; both down_scale and up_scale are set to 0.5.

Figure 7:
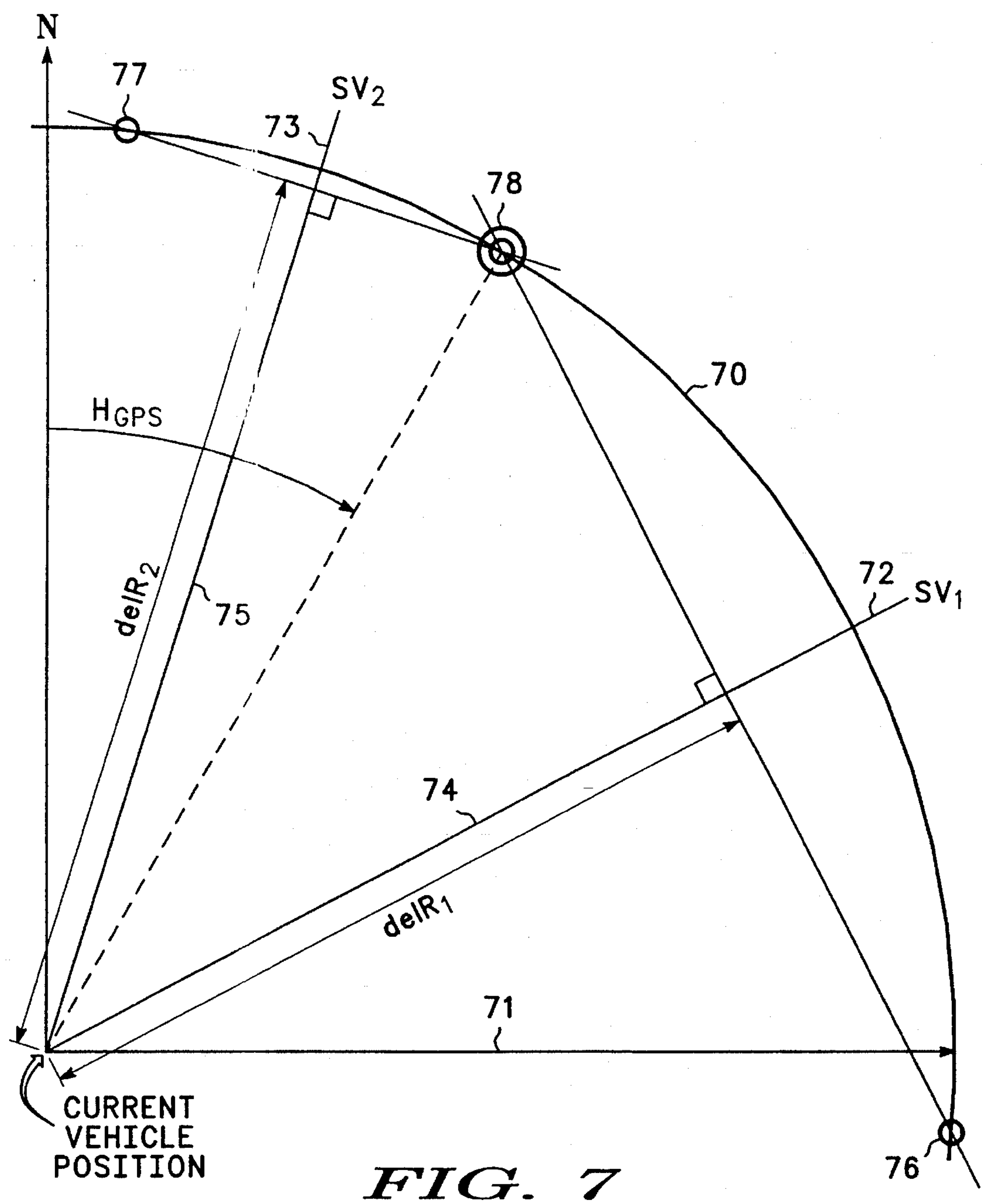
FIG. 7 is a map layout of movement of a vehicle tracked by GPS in accordance with the present invention.

Following propagation, an assessment is made of the accuracy with which a heading can be derived from GPS with the odometer assistance 52. Computation of an error variance associated with the GPS heading is a function of the error variance of the Doppler difference (as derived by the Doppler compensation filter), and the geometry of the odometer-assisted heading measurement. FIG. 7 illustrates the geometry associated with this measurement. A circle 70 of radius 71 (the current distance traveled as determined from the odometer) is drawn to illustrate the possible locations (and headings) for the vehicle based upon odometer information alone. Superimposed on this circle are the Lines Of Sight to two GPS satellites, projected on the local horizontal plane, denoted 72 ($SV_1$) and 73 ($SV_2$) respectively, in line of sight projection. The possible distances traveled along each of the LOSs are denoted 74 (delR1) and 75 (delR2), respectively, for the two satellites. Mathematically, each delR value is given by:

$$\text{delR}=(\text{PRRres}-\text{delF}) * \cos E * dt \quad (6)$$

Each integrated Doppler value, when compensated for delF, places the vehicle on one of two locations on the circle 70, illustrated in FIG. 7 by single circles 76, 77 abd 78; combining the intersections from two satellites resolves this ambiguity, in addition to removing the effects of the frequency offset delF. The single point on the circle which is circled twice 78 corresponds to the GPS derived heading in FIG. 7 denoted $H_{GPS}$, since it intersects the solution from both satellites. Assignment of an error variance to the GPS derived heading requires a linearization of the heading equations, since the relationship between the GPS Doppler measurements and heading is inherently nonlinear. Equation (7) expresses the required linearization about the propagated heading H:

$$\text{delPRR}_i=\text{PRRres}_i-v * (\cos E_i*\sin A_i*\sin H+\cos E_i*\cos A_i*\cos H+\sin E_i*M) \quad (7)$$

where:

$\text{PRRres}_i=\text{PRR}_i+\text{vsat}_i^T\text{uLOS}_i-\text{delfs}_i$ $\text{delfs}_i$=frequency correction (including relativistic component) for ith satellite $E_i$, $A_i$ are elevation and azimuth angles to the ith satellite M is the estimated slope of the road Note that the estimated slope of the road, M, appears in Equation (7). This estimate can be determined from the GPS vertical velocity solutions by filtering them with a model for the variation in road slope with distance traveled (as determined from the calibrated odometer). Alternatively, the slope can be determined concurrently with the vehicle heading by processing individual (compensated) Doppler measurements, or neglected, since road slope variations should be minimal.

Differencing Doppler residuals from two satellites and expanding the terms involving the sine and cosine of heading to first order in heading error results in the following (linear) expression for the heading error:

$$delPRRij=v * (\cos Ej * \sin dAj - \cos E_i * \sin dA_i) * delH \quad (8)$$

where:

$E_i$, $E_j$ represent the satellite elevation angles dA=A−H $A_i$, $A_j$ represent the satellite azimuth angles delH=the heading error Equation (8) thus represents one equation in a single unknown, the change in heading from the propagated value (delH). Prior to incorporating this as a possible measurement for the Schmidt-Kalman filter, the error variance associated with the determined heading is computed to ensure the validity of the Schmidt-Kalman (linear) measurement model. An excessive error variance will be neglected by the Heading Filter 53, but saved for possible later use in a reconstruction mode. Computation of the error variance associated with the heading update begins with the assignment of an error variance to each pair-wise difference, $varPRR_{ij}$, as given by Equation (4). The error associated with the heading measurement derived from each Doppler pair can be expressed as:

$$varH_{ij}=varPRR_{ij}/h_{ij}^2 \quad (9)$$

where:

$h_{ij}=v * (\cos E_j * \sin dA_j - \cos E_i * \sin dA_i)$

More generally, when m Doppler measurements are available, the linear dependence of the heading error upon Doppler measurement error is related by a vector of dimension m-1 with each element assigned to the corresponding $h_{ij}$. Given this sensitivity vector, and the individual Doppler error variances, a Weighted Least Squares (WLS) solution for the heading update is found 54; the WLS is required since all the Doppler error variances will generally not be equal or uncorrelated (they are not equal, since some differences may not be compensated by the Doppler compensation filter, and the correlation is induced by the Doppler differencing). An error variance for the resultant heading update is computed as part of the WLS update, and can be used in the test 53.

Given that the error variance associated with the GPS heading update is not excessive, the heading residual is found from the computed update 55 (i.e., the value determined for delH). The magnitude of this residual is compared against an error variance computed by the Schmidt-Kalman filter as a function of the propagated heading error variance and the error variance assigned to the heading update. Should the residual prove excessive 56, the current GPS heading update is labeled as bad, and a counter is incremented. An excessive count will result in an invalid heading declaration, dictating a re-initialization of the heading filter 50. If the residual is within the expected range, the bad heading measurement counter is reset to zero, and the heading will be updated using the gain computed by the Schmidt-Kalman filter 57, and the heading error variance will like-wise be updated 58. The equations of the Schmidt-Kalman filter are well known in the art, and will not be repeated here.

Before describing the operation of the Position Filter 60, some comments are in order regarding the handling of odometer pulse counts when the heading determination is unreliable. As previously mentioned, this information is saved, and can be used for possible reconstruction of the trajectory of the vehicle in "delayed real-time". This reconstruction feature can significantly extend the periods when limited Doppler information can be used to determine the vehicle's position through dead reckoning. The reconstruction process relies on the fact that vehicle heading changes usually occur at a uniform rate (e.g., turning a street corner), and are generally separated by segments at constant heading (i.e., driving down a street). Changing lanes within a street is an exception to this general rule, but does not result in a significant position error relative to a straight trajectory of the same distance traveled. The trajectory reconstruction will therefore examine previous vehicle headings and distances traveled at each heading when an accurate heading has once again been determined following a loss of accurate heading, and reconstruct the vehicle's position assuming a uniform heading change between the two accurate headings. The reconstruction can only be performed within certain limits, of course: a significant heading change can only be used to reconstruct the trajectory over a relatively short period of time (i.e., a few seconds), since it is generally unknown when the heading change started; however, a nearly constant heading can be used over longer periods of time, providing the distance traveled does not permit turning two corners (i.e., returning to the same heading).

Following operation of the Heading Filter 50, the computed heading and odometer-derived distance traveled are used to propagate the vehicle's position forward in time; since the vehicle may be turning, an average value for heading is used, as shown in Equations. (10) and (11):

$$del\_pe=d * (\sin H_k+\sin H_{k-1})/2 \quad (10)$$

$$del\_pn=d * (\cos H_k+\cos H_{k-1})/2 \quad (11)$$

where:

del_pe is the east component of position change del_pn is the north component of position change d is the distance traveled (from the odometer)

Hk is the current heading derived by the heading filter

Hk-1 is the previous heading derived by the heading filter

Note that averaging the sine and cosine of heading in Equations. (10) and (11) is a good approximation to computing the sine and cosine of the average heading, and saves additional sine and cosine evaluations. Propagation of position error variances accompanies Equations (10) and (11), and is required by the position filter 61. The propagation makes use of the error variance assigned to the computed heading by the heading filter, and an assumption about the accuracy of the odometer scale factor calibration in steady state (e.g., 1% residual error); these error effects are assumed independent. In addition to the east and north position error variances, their error correlation must be propagated, since the north and east position errors are correlated through the common heading and odometer scale factor errors. Following propagation of these error variances, this information is used by the position filter, which is also a Schmidt-Kalman filter: the available pseudo range measurement errors are modeled as correlated, with a time constant characteristic of SA, the dominant error contributor. Error variances are assigned to each pseudo range measurement 62 which include the effects of both correlated and noise-like error components, and reflect whether or not differential corrections are available. Measurement residuals are found from the predicted positions 63, including the vehicle's altitude. The altitude is propagated ahead in time using the outputs of the road slope filter:

$$h_k = h_{k-1} + d * M$$

where: $h_{k-1}$ denotes previous altitude $h_k$ denotes current altitude

The measurement residuals are tested 64 by comparing them with their expected variances derived by the Schmidt-Kalman filter: an excessive residual forces the bad measurement counter to be incremented, and an excessive count will force re-initialization of the position filter. This re-initialization suspends operation of the position filter until a valid new position is found from GPS pseudo range measurements alone. If the residuals are determined to be reasonable, the filtered positions are updated 65 using gains derived by the Schmidt-Kalman filter, and the position error variances are similarly updated 66.

Finally, the Position Filter 60 may be required to operate when the Heading Filter 50 cannot accurately determine heading. When this occurs, the Position Filter 50 requires special design, and can extend the effective GPS coverage significantly. This mode of the Position Filter is referred to as a constrained heading mode, and the expected position changes are constrained about the current estimated heading with an uncertainty assigned which reflects the full (nonlinear) affect of heading error on position error. The error effects upon the sine and cosine of the estimated heading can be determined in either of two ways, depending upon the expected magnitude of the heading error:

$$del\_pe\_err = d * (\cos H * delH - \sin H * delH^2/2 + \ldots) \quad (11)$$

$$del\_pn\_err = d * (^{-\sin H * delH - \cos H * delH2}/2 + \ldots) \quad (12)$$

Equations. (11) and (12) represent Taylor series expansions in the sine and cosine of the erroneous heading truncated to second order in delH. Alternatively, if a second order expansion does not model the expected error well, the sine and cosine can be evaluated over the expected range of headings, i.e., for the estimated heading plus or minus twice the standard deviation of the error. The constrained heading mode will continue until an accurate heading is determined, when it will revert to its normal processing mode. Prior to this, the reconstructed trajectory will be examined as an alternative starting point for the computed position.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An odometer assisted Global Positioning System (GPS) method for vehicle positioning, said vehicle including an odometer, a processor and a GPS receiver, said method comprising the steps of:

finding a last known position of the vehicle;

finding by the GPS receiver, for each satellite of the GPS in line of sight with the vehicle, a measured Doppler and a measured pseudo range;

determining by the processor from the odometer a speed of the vehicle;

determining by the processor a Doppler compensation to the measured Doppler for each satellite of said GPS in line of sight with the vehicle;

combining by the processor the speed of the vehicle with the Doppler compensation to the measured Doppler to produce a new heading of the vehicle;

the step of combining by the processor the speed of the vehicle with the Doppler compensation includes the steps of;

propagating a GPS heading error variance for expected dynamics of the vehicle;

computing actual GPS heading error variance using the speed and the line of sight of each satellite with the determining whether the actual GPS heading error variances are excessive: and combining by the processor the last known position of the vehicle with the new heading and with the Doppler compensation to the measured Doppler and the measured pseudo range to provide a new position of the vehicle.

2. The method as claimed in claim 1, wherein the step of determining by the processor the speed of the vehicle includes the steps of:

computing a scaling factor from odometer information including a pulse count increment and the speed of the vehicle;

retrieving a previous scaling factor; and finding a residual difference between the scaling factor and the previous scaling factor.

3. The method as claimed in claim 2, wherein the step of determining by the processor the speed of the vehicle further includes the steps of:

determining whether the residual difference is excessive;

if the residual difference is excessive:

incrementing a bad scale factor count;

determining whether the bad scale factor count is excessive;

reinitializing the scaling factor, if the bad scale factor count is excessive; and computing the speed of the vehicle, if the bad scale factor count is not excessive.

4. The method as claimed in claim 3, wherein the step of determining by the processor the speed of the vehicle further includes the steps of, if the residual difference is not excessive:

resetting the bad scale factor count;

updating the previous scaling factor to be equal to the computed scaling factor; and computing the speed of the vehicle.

5. The method as claimed in claim 1, wherein the step of determining by the processor the Doppler compensation includes the steps of:

determining whether the vehicle is stationary; and constructing a stationary selective availability measurement on each measured Doppler.

6. The method as claimed in claim 5, wherein the step of determining by the processor the Doppler compensation further includes the steps of, if the vehicle is not stationary:

determining whether differential Doppler correction is available; and measuring differential selective availability for each measured Doppler.

7. The method as claimed in claim 6, wherein said step of determining by the processor the Doppler compensation further includes the steps of, if the vehicle is not stationary and if differential Doppler correction is unavailable:

propagating Doppler compensation estimates for first and second order models; and compensating the measured Doppler using selective availability estimates.

8. The method as claimed in claim 7, wherein the step of determining by the processor a Doppler compensation further includes the steps of:

processing the differential selective availability measurement to refine the selective availability estimates; and compensating the measured Doppler using the selective availability estimates.

9. The method as claimed in claim 8, wherein the step of combining by the processor the speed of the vehicle with the Doppler compensation further includes the steps of, if the actual GPS heading error variances are not excessive:

computing a GPS heading using the speed of the vehicle and the measured Doppler; and forming a GPS heading residual from the GPS heading and a previous GPS heading.

10. The method as claimed in claim 9, wherein the step of combining by the processor the speed of the vehicle with the Doppler compensation further includes the steps of:

determining whether the GPS heading residual is excessive;

if the heading residual is excessive:

incrementing a bad heading counter;

determining whether the bad heading counter is excessive; and setting an invalid heading flag, if the bad heading counter is excessive.

11. The method as claimed in claim 10, wherein the step of combining by the processor the speed of the vehicle with the Doppler compensation further includes the steps of, if the GPS heading residual is not excessive:

resetting the bad heading counter to zero;

updating a heading estimate to be equal to the GPS heading weighted with the previous GPS heading; and updating a heading error variance to be the GPS heading error variance weighted with a previous GPS heading error variance.

12. The method as claimed in claim 11, wherein the step of combining by the processor the last known position includes the steps of:

propagating position error variances;

computing a pseudo range error variance; and forming measurement residuals of an estimated position of the vehicle.

13. The method as claimed in claim 12, wherein the step of combining by the processor the last known position further includes the steps of:

determining whether the measurement residuals are excessive;

if the measurement residuals are excessive:

incrementing a bad measurement counter;

determining whether the bad measurement counter is excessive; and setting an invalid position flag, if the bad measurement counter is excessive.

14. The method as claimed in claim 13, wherein the step of combining by the processor the last known position further includes the steps of, if the measurement residuals are not excessive:

resetting the bad measurement counter;

updating a position of the vehicle to be the estimated position of the vehicle weighted with the measurement residuals; and updating the position error variances to be the position error variance weighted with the pseudo range error variance.

15. An odometer assisted Global Positioning System (GPS) method for vehicle positioning, said vehicle including an odometer, a processor and a GPS receiver, said method comprising the steps of:

finding by the GPS receiver, for each satellite of the GPS in line of sight with the vehicle, a measured Doppler and a measured pseudo range;

determining by the processor from the odometer a speed of the vehicle;

determining by the processor a Doppler compensation to the measured Doppler for each satellite of said GPS in line of sight with the vehicle;

combining by the processor the speed of the vehicle with the Doppler compensation to the measured Doppler to produce a heading of the vehicle;

the step of combining by the processor the speed of the vehicle with the Doppler compensation includes the steps of:

propagating a GPS heading error variance for expected dynamics of the vehicle;

computing actual GPS heading error variance using the speed and the line of sight of each satellite with the vehicle;

determining whether the actual GPS heading error variances are excessive; and combining by the processor the heading with the Doppler compensation to the measured Doppler and with the measured pseudo range to provide a position of the vehicle.

* * * * *

UNITED STATES PATENT AND TRADEMARK OFFICE

CERTIFICATE OF CORRECTION

PATENT NO. : 5,525,998

DATED : June 11, 1996

INVENTOR(S) : George Jeffrey Geier

It is certified that error appears in the above-indentified patent and that said Letters Patent is hereby corrected as shown below:

In column 10, claim 1, line 18, at the end of the line after "the" (second occurrence) insert --vehicle;--.

Signed and Sealed this

Twenty-fourth Day of September, 1996

Attest:

BRUCE LEHMAN

*Attesting Officer* *Commissioner of Patents and Trademarks*